Figure 1:
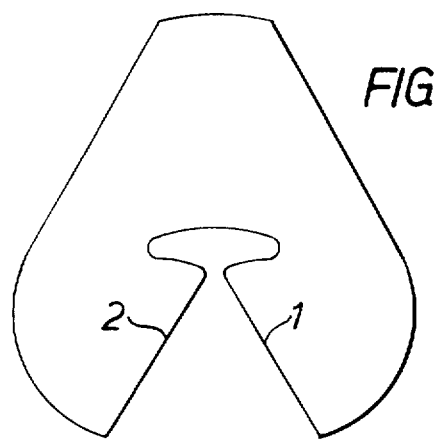

United States Patent

[15] 3,675,692

Jeans

[45] July 11, 1972

[54] METHODS OF MAKING ARTICLES FROM FIBER BOARD

[72] Inventor: Graham Wilton Jeans, 77 Butterfield Road, Wheathampstead, England

[22] Filed: March 24, 1970

[21] Appl. No.: 22,207

[52] U.S. Cl. ............................144/317, 144/309 R, 144/327, 264/322
[51] Int. Cl. .....................B27d 1/08, B27m 3/18, B27h 1/00
[58] Field of Search................144/309, 327, 320, 317, 316; 264/322

[56] References Cited

UNITED STATES PATENTS

| | | | |
|---|---|---|---|
| 2,934,790 | 5/1960 | Shwayder | 144/309 R X |
| 3,261,898 | 7/1966 | Caron et al. | 264/322 X |
| 2,338,685 | 1/1944 | Dee | 144/327 X |
| 3,110,643 | 11/1963 | Downing | 264/322 |
| 1,989,015 | 1/1935 | McKellid | 264/322 |
| 2,386,821 | 10/1945 | Tardiff | 144/309 R |

Primary Examiner—Donald R. Schran
Attorney—Newton, Hopkins & Ormsby

[57] ABSTRACT

This invention provides a method of making furniture from flat sheets of fiberboard In accordance with the method a flat sheet of fiberboard is cut to a particular shape and then softened preferably by immersion in a liquid. The cut and softened sheet is then bent to a required three-dimensional shape and is fixed in that shape by drying.

2 Claims, 6 Drawing Figures

PATENTED JUL 11 1972 3,675,692

METHODS OF MAKING ARTICLES FROM FIBER BOARD

This invention relates to methods of making articles of furniture from fiber board, and in particular hard board, and to articles made by such methods.

According to the invention I provide a method of making an article of furniture comprising the steps of cutting a flat sheet of fiberboard to a particular shape softening the cut sheet by treatment with a fluid, bending the softened cut sheet to the required three-dimensional shape and then fixing the sheet in the required three dimensional shape by drying. The invention also includes a method of making an article of furniture comprising the steps of cutting a flat sheet of fiberboard to a particular shape which includes parts that must be secured together to form the finished article, softening the cut sheet by treatment with a fluid, bending the softened cut sheet to the required three-dimensional shape with the said parts adjacent to one another, securing the adjacent parts together and then fixing the sheet in the required three-dimensional shape by drying. The three-dimensionally shaped piece is preferably joined to at least one other three-dimensionally shaped piece to form a laminated structure.

The invention also includes articles when made in accordance with the above method.

One advantage of the invention is that it provides articles which are strong.

The fluid may be liquid or steam. The other three-dimension-ally shaped piece or pieces may also be made of fiber board, or may consist of other materials such as paper, cardboard, textile fabrics, rubber, plastics materials, wood, or metal. The sheets are preferably joined together by adhesive.

The method according to the invention is particularly applicable to the manufacture of seats for chairs and sofas. Therefore according to another feature of the invention I provide a method of making a seat from fiber board, including the steps of cutting a flat sheet of fiber board to a particular shape which includes parts that must be secured together to form the finished seat softening the cut sheet with water or steam, bending the softened sheet to the shape of a seat with the said parts adjacent to one another, securing the adjacent parts together joining the shaped piece to at least one other sheet, to form a laminated structure and fixing the structure in the shape of a seat by drying.

The seat thus formed may if desired then be upholstered, or decorated in any known manner, for example with paint or plastics materials, and may be fitted to a base frame to form a chair.

A sofa may be constructed from a seat formed according to the invention by cutting the seat vertically into two sections and joining these by a frame, for example a conventional timber frame, so that each section forms one end of the sofa.

The sofa may then be upholstered, decorated and fitted to a base frame as above.

Figure 2:
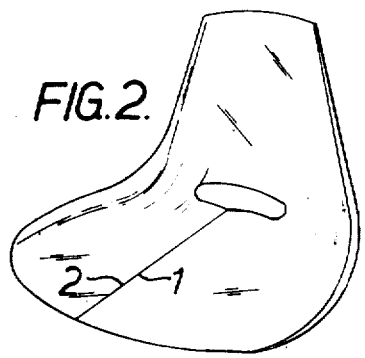
Figure 4:
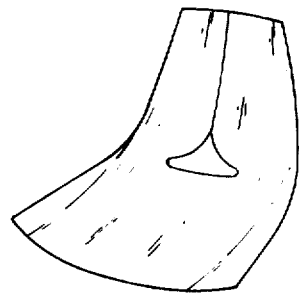
Figure 3:
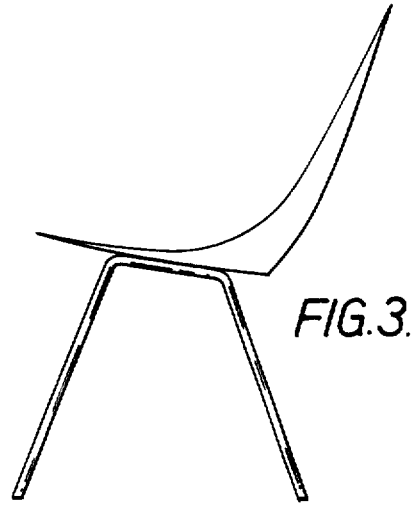
Figure 5:
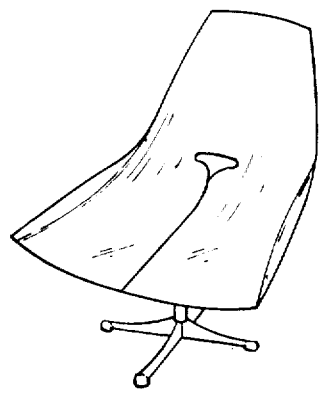
Figure 6:
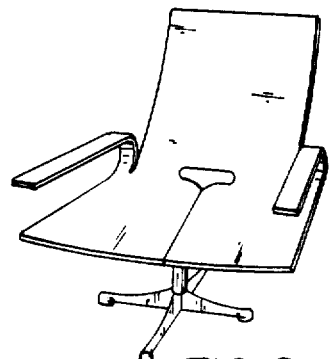

One embodiment of the invention will now be described by way of example and with reference to the drawings, FIG. 1 shows a flat piece of hardboard which has been cut prior to bending FIG. 2 shows the same piece in perspective after it has been bent to the shape of a chair seat FIG. 3 is a side elevation of a finished chair made from this seat FIGS. 4, 5 and 6 show three other chairs made according to the invention.

In operation a flat piece of hardboard is cut to the shape shown in FIG. 1. The cut piece is then deformed by bringing the edges 1 and 2 together and joining them using adhesive (FIG. 2) the hardboard first having been softened by treatment with steam. The resulting deformed piece of hardboard is next dried and joined using adhesive to a similarly shaped piece of hardboard (not shown) to form a laminated construction. The resulting laminated seat is then upholstered by covering it with sheet polyvinyl chloride and then attached to a tubular steel base frame to form a chair (FIG. 3).

Examples of other chairs made according to the invention are shown in FIGS. 4, 5 and 6. FIGS. 5 and 6 show swivel chairs, the latter having arms formed from the same piece of fiberboard as the seat.

Depending upon the material used in conjunction with the fiberboard to form the laminated structure, the finished structure may either be rigid or resilient.

I claim:

1. A method of making a seat having a three-dimensional shape from flat sheets of fiberboard comprising the steps of:
   a. cutting a first flat sheet of fiberboard to a desired shape which includes spaced parts that must be secured together to form the finished seat;
   b. softening the cut sheet by the application of steam;
   c. bending the softened cut sheet to the required three-dimensional seat shape with said parts adjacent to one another;
   d. securing the adjacent parts together by adhesive means;
   e. repeating the above steps (a) – (d) with a second flat sheet of fiberboard to produce a second three-dimensional seat shape substantially the same as the first seat shape;
   f. joining said first and second three-dimensional seat shapes together adhesively to form a laminated seat; and,
   g. fixing said laminated seat in the required shape by drying.

2. A method as claimed in claim 1 wherein said spaced parts have inwardly converging edges which are brought together when the sheet is bent to the required shape.

* * * * *